Sept. 29, 1970 J. L. KELLY ET AL 3,531,130

PIVOTAL SUPPORT ASSEMBLY FOR PHONOGRAPH RECORD AND PLAYBACK ARMS

Original Filed Jan. 16, 1967 3 Sheets-Sheet 1

INVENTORS
JACK L. KELLY
RONALD K. WIANDT

BY Thomas A. Briody
ATTORNEY

Sept. 29, 1970 J. L. KELLY ET AL 3,531,130

PIVOTAL SUPPORT ASSEMBLY FOR PHONOGRAPH RECORD AND PLAYBACK ARMS

Original Filed Jan. 16, 1967 3 Sheets-Sheet 2

INVENTORS
JACK L. KELLY
RONALD K. WIANDT

BY Thomas A. Briody
ATTORNEY

PIVOTAL SUPPORT ASSEMBLY FOR PHONOGRAPH RECORD AND PLAYBACK ARMS

Original Filed Jan. 16, 1967

INVENTORS
JACK L. KELLY
RONALD K. WIANDT

BY Thomas A. Brody
ATTORNEY

United States Patent Office 3,531,130
Patented Sept. 29, 1970

3,531,130
PIVOTAL SUPPORT ASSEMBLY FOR PHONOGRAPH RECORD AND PLAYBACK ARMS

Jack L. Kelly, Bethel Park, Pa., and Ronald K. Wiandt, Decatur, Ill., assignors to General Electric Company, a corporation of New York Continuation of application Ser. No. 609,579, Jan. 16, 1967. This application Dec. 6, 1968, Ser. No. 784,537
Int. Cl. G11b *3/30*
U.S. Cl. 274—23 3 Claims

ABSTRACT OF THE DISCLOSURE

A recording and reproducing device with a simple and efficient mechanism that pivotally supports a tone arm thereof for horizontal and vertical movement. This mechanism includes a one-piece bearing sleeve having a pair of opposed ears formed on its outer wall, a cylindrical stud which supports the sleeve for rotative movement about a vertical axis, and a pair of bearing apertures formed in opposed spaced apart walls of a tone arm. These apertures cooperate with the ears of the sleeve to facilitate rotative movement of the tone arm about a horizontal axis. The one-piece bearing sleeve also includes a pair of upper and lower hooks to facilitate the support of a tension spring used to bias the tone arm.

This invention relates to phonograph devices, and more particularly to pivotal supporting structures for phonograph recording and playback arms of the type selectively movable about either a horizontal or vertical axis.

The present application is a continuation of our copending application Ser. No. 609,579 filed Jan. 16, 1967, assigned to the assignee as the instant application, and now abandoned.

Most recording and playback arm structures of the prior art each require separate shafts for providing the associated desired horizontal and vertical movements of the "tone" arm. Such structures which have not included both shafts present less than desirable efficiencies or other disadvantages. Accordingly, it is an important object of this invention to provide an improved pivotal supporting arrangement for a recording or reproducing arm which eliminates the need of two separate shafts.

It is another object of the present invention to provide an improved recording and reproducing device incorporating a novel pivotal support for the recording and reproducing arms thereof.

Still another object of this invention is to provide an improved pivotal support for a recording or a reproducing arm, which support is efficient in operation and economical in cost.

It is still a further object of our invention to provide an improved pivotal support for a recording or a reproducing arm, which support includes a minimum number of parts.

In accordance with the present invention, in one form thereof we have provided a recording and reproducing device that includes a support and a turntable rotatably arranged thereon. The turntable receives a record upon or from which sound may be selectively recorded or reproduced. For recording and reproducing sounds relative to a record, a stylus bearing recording arm and a stylus carrying playback arm are provided. With such an arrangement, a pivotal support for each of the arms is facilitated which requires only two main parts. For enabling pivotal movement of each arm about a vertical axis, a vertically extensive cylindrical supporting stud is surrounded by a bearing sleeve connected to the supported end of the arm. The arm is thus arranged to swivel about the stud for horizontal movement relative thereto. For enabling pivotal movement of the arm about a horizontal axis, the bearing sleeve has a pair of horizontally extensive ears formed on opposite sides thereof. These ears are received by a pair of bearing apertures formed in opposed spaced apart walls of the arm to effect swivelling movement of the arm in a vertical direction without requiring any separate shaft. Such a pivotal support arrangement for a recording and reproducing arm is simple, effective, and economical in cost.

By further aspects of the present invention, additional desirable features may be included in the pivotal supporting assembly device, and the specification concludes with claims particularly pointing out and distinctly claiming the subject matter which we regard as our invention. The invention, however, as to organization and method of operation, together with further objects and advantages thereof, may best be understood by reference to the following description when taken in conjunction with the accompanying drawings, in which:

Figure 1:
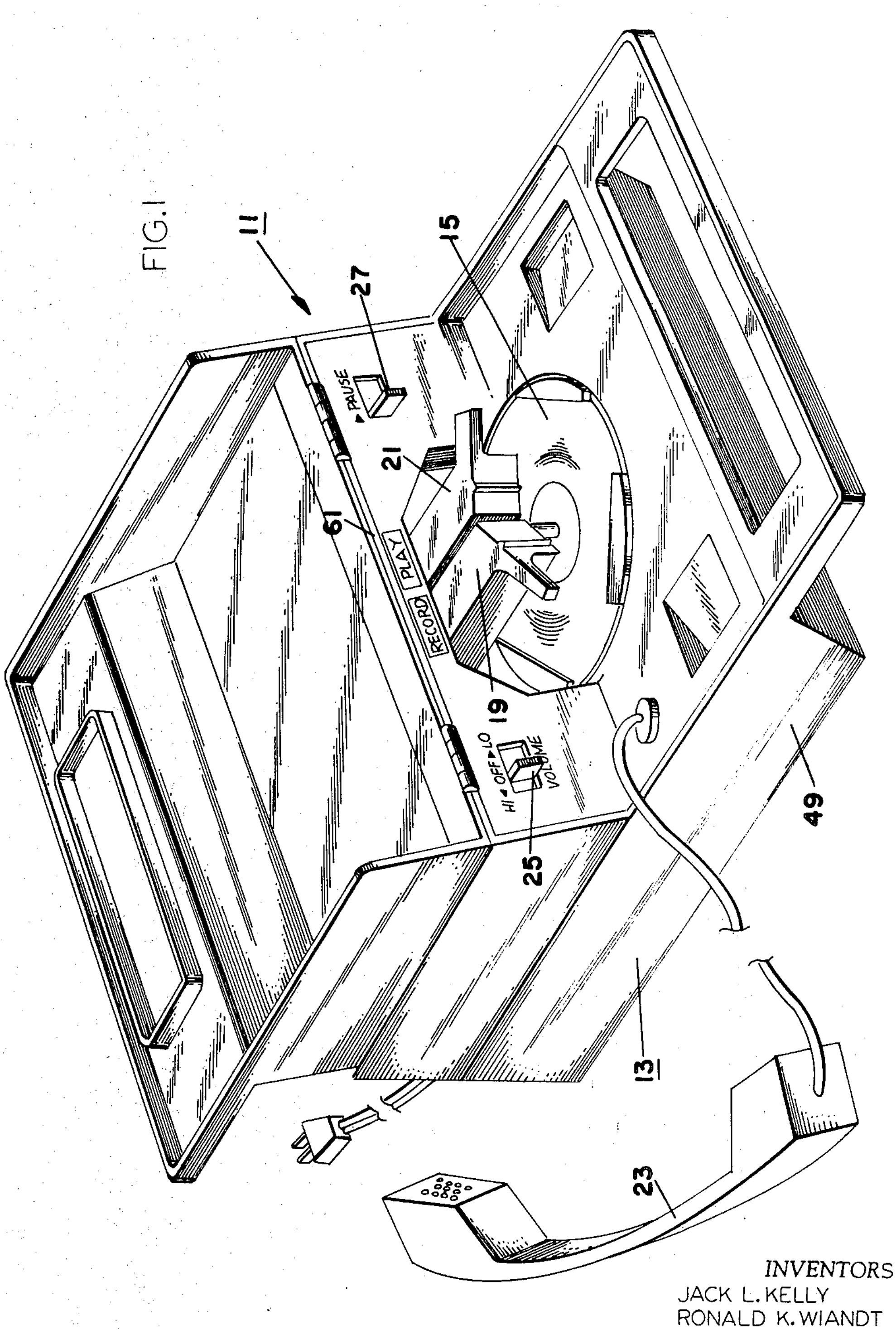
FIG. 1 is a perspective view of an embossable disc-type recording and reproducing device embodying the present invention, in one form thereof.
Figure 2:
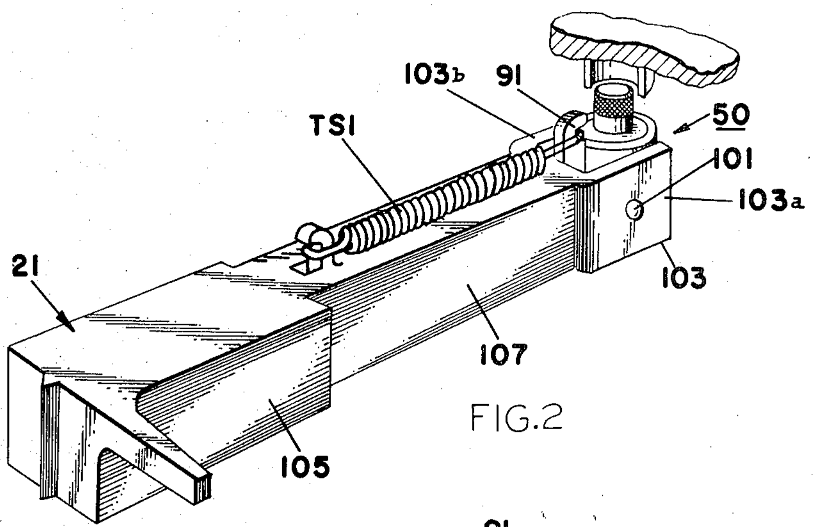
FIG. 2 is a perspective view showing the playback arm of the device of FIG. 1, with this exemplary pivotal support assembly.

Referring in detail to the drawings, and initially particular to FIG. 1 thereof, there is shown a disc-type recording and reproducing device 11 embodying one form of our invention. The recording device 11 essentially comprises a three part housing 13 wherein turntable 15 and its driving motor (not shown) are located, recording arm 19 and its associated recording head, playback arm 21 and its associated playback head, an amplifier (not shown) and a combination speaker-microphone type of handset 23. For controlling the device 11 there is also provided an "on-off" and "volume" control knob 25 and a "pause" control knob 27. Knob 27 is thus for selectively coupling and decoupling the driving motor to the turntable 15 for facilitating desired momentary interruption of its movement.

To effectively support the pivotal movement of recording arm 19 and playback arm 21 about a vertical and a horizontal axis, there is provided in accordance with the present invention a novel bearing assembly 50 for supporting these arms. This bearing assembly 50 is illustrated in FIGS. 2–8. It essentially comprises a specially configured cylindrical stud 51, a bearing sleeve 53, and a C-ring 55 for cooperation with stud 51 to secure sleeve 53 into rotatable bearing engagement therewith.

Figure 7:
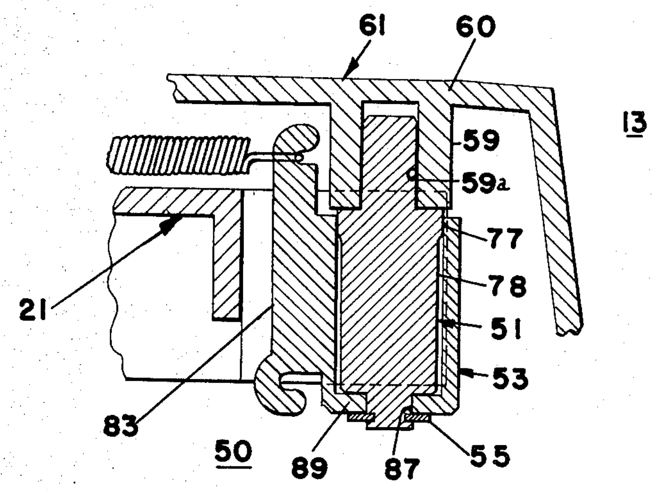
FIG. 7 is a fragmentary sectional view taken generally along the line 7—7 of FIG. 6, and including the sectional relationship of the supporting housing to the bearing stud.
Figure 8:
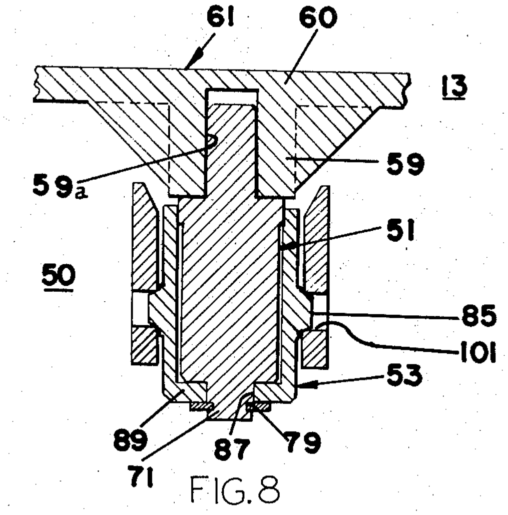
FIG. 8 is a fragmentary sectional view similar to FIG. 7 but taken along the line 8—8 of FIG. 6.

The stud 51 is constructed so that it includes a knurled upper stem portion 57 for press fitted engagement with a molded socket 59 formed in the top wall 60 of the housing deck 61 (FIG. 7). Thus, the knurled stem portion 57 of stud 51 is in compressive lateral engagement with wall 59*a* of the socket to tightly retain the stud 51 in depending relationship from the supporting housing 13.

Stud 51 also includes a generally cylindrical intermediate body portion 63 connected at its upper end (viewing FIG. 3) to the upper stem 57 by annular horizontal shoulder 67. The body portion 63 is connected at its lower end (FIG. 3) to a lower stem portion 71 of the stud 51 by annular horizontal shoulder 73.

The body portion 63 of stud 51 is stepped inwardly at 75 to provide an upper cylindrical rim section 77 of one bearing diameter and a main cylindrical section 78 having an outside diameter of less magnitude than the diameter of the upper rim section 77 (see FIG. 7). The lower stem 71 of stud 51 has a peripheral groove 79 formed therein near its bottom. Groove 79 is for receiving the C-shaped clip or ring 55 that is designed for resiliently retaining the bearing sleeve 53 in bearing engagement with stud 51.

Figure 3:
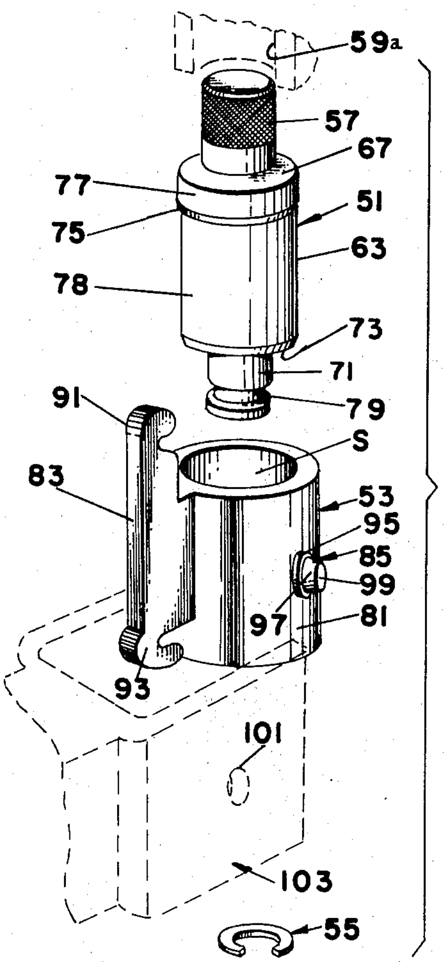
FIG. 3 is an exploded perspective view of the pivotal support assembly of FIG. 2.
Figure 4:
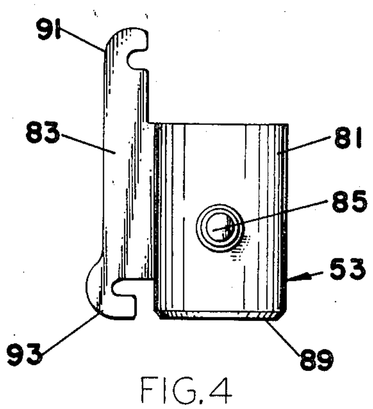
FIG. 4 is a side elevation view of the bearing sleeve embodying the present invention.
Figure 5:
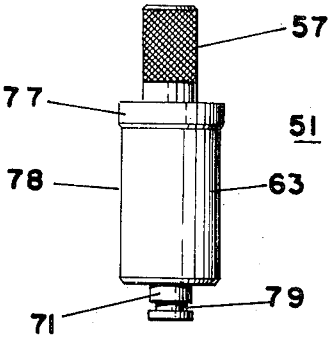
FIG. 5 is an elevation view of the bearing stud part of the pivotal support assembly.
Figure 6:
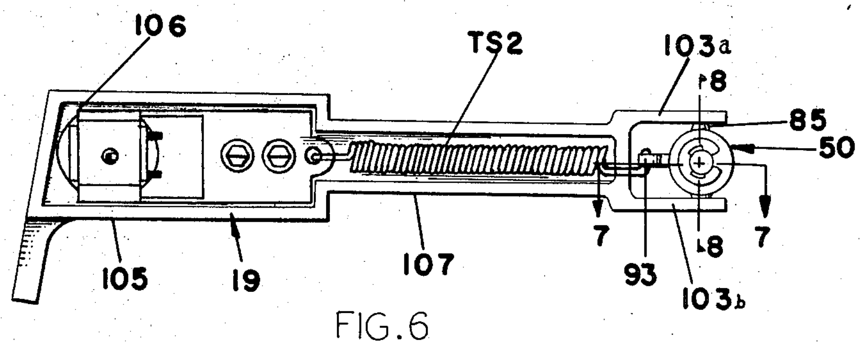
FIG. 6 is a bottom view of the recording arm and its pivotal support assembly.

Turning now to a description of the other important element of bearing assembly 50, attention is now directed to the bearing sleeve 53 of FIG. 3. As shown therein, the bearing sleeve 53 includes a cup shaped body 81 and an integrally related vertical portion 83. The body 81 has a generally cylindrical external and internal configuration, with a pair of opposed ears 85 projecting outwardly from opposite sides of the vertical extremity of body 81 and a central bearing aperture 87 formed in bottom 89 (FIG. 7).

For providing an effective vertical type swivelling action of the recording and reproducing arms 19 and 21 about the bearing sleeve 51, the aforementioned ears 85 have been provided. Ears 85 each have a peripheral washer like base 95 of uniform external diameter, and a frusto-conical outer bearing portion 97 having a gradually diminishing external diameter between washer base 95 and the outermost face 99.

The ears 85 of each bearing sleeve 53 cooperate with and are received by a pair of aligned cylindrical apertures 101 formed in the bifurcated supporting end 103 of arms 19 and 21. More partcularly, as best shown by viewing FIGS. 2 and 6, the "tone" arms 19 and 21 each include a forward end 105 which is recessed to support a recording or reproducing head 106 depending therefrom, an intermediate body portion 107, and a bifurcated supporting end 103 which includes a pair of spaced apart parallel walls **103*a* and 103*b*. Each of the walls 103*a* and 103*b* has an aperture 101 formed therein for receiving an associated ear 85**.

For securing the "tone" arm to the ears of the bearing sleeve 53, the walls **103*a* and 103*b* are simply spread laterally apart sufficiently so that the ears 85 may be slid along the inwardly facing surfaces of walls 103*a*, 103*b* for placement into their desired apertures 101. It will thus be understood from viewing FIG. 8, that the apertures 101 of the "tone" arm serve as bearing sockets for the reception of bearing ears 85. In view of the frusto-conical configuration of the ears 85** there is achieved a ring-type of linear bearing contact affording minimal frictional resistance for the pivotal movement of the "tone" arm about a horizontal axis.

It should also be noted that the peripheral washer-like base 95 of each ear 85 of sleeve 53 serves a spacing function by locating the walls **103*a*, 103*b* of the arm 21 in a predetermined spaced apart contiguity to the main external periphery of sleeve 53. The cylindrical or integral washer-like base 95 of each ear 85 thus serves to help accurately locate the frusto-conical bearing portion 97 of each ear 85 into a relatively precise relationship with the bearing apertures 101 of the arm 21**, by limiting overtravel and thereby minimizing undesirable friction resulting from such overtravel.

For enabling the bearing assembly 50 to readily facilitate the use of spring action to bias the recording head into engagement with a record disc or to bias the playback head away from the record disc against the gravitational force imparted thereto, the vertical portion 83 of bearing sleeve 53 has an upper hook 91 and a lower hook 93 integrally formed thereon. Upper hook 91 comprises an upwardly disposed cutout area of portion 83 which faces generally toward ears 85, and is adapted to receive a spring such as the coiled tension spring TS1 shown in FIG. 2, to help bias the free end of the playback arm in a clockwise direction of rotation (viewing FIG. 2), or upwardly and away from the turntable 15. Lower hook 93 comprises a downwardly disposed cutout area of portion 83 which also faces generally toward ears 85, and is adapted to receive a spring such as the coiled tension spring TS2 shown in FIG. 6, to help bias the free end of the recording arm downwardly toward the turntable 15.

For an overall description of the operation of the improved bearing arrangement achieved by the present invention, attention is now directed to FIGS. 1, 2, 7, and 8. As shown therein, when the playback arm 21 is mounted upon the bearing assembly 50, the frusto-conical bearing surfaces 97 of ears 85 of the bearing sleeve 53 are in bearing engagement with apertures 101 of the arm 21 so that the arm 21 is free to swivel on the sleeve 53 about a horizontal axis. Playback arm 21 may thus be placed into engagement with a record on the turntable 15 or removed therefrom and moved vertically into its rest position (wherein it is shown in FIG. 1).

The bearing sleeve 53 is fitted into cooperative bearing engagement with stud 51 so that the upper rim section 77 of stud 51 is in horizontal bearing engagement with the inner cylindrical surface S of sleeve 53, and the lower stem portion 71 of the stud 51 is in horizontal bearing engagement with the central aperture 87 in bottom 89 of the sleeve 53. Movement of sleeve 53 out of alignment with its vertical axis, or in a horizontal direction is thus controlled by rotative engagement of these surfaces.

The gravitationally produced engagement of the lower surface of bottom 89 of the sleeve 53 with the C-ring 55 provides the vertical bearing engagement for the mechanism. It will thus be seen that the playback arm 21 is free to swivel about a vertical axis by means of the rotatable bearing cooperation between sleeve 53, C-ring 55, and the depending stud 51.

In view of the integral location of the upper and lower hooks 91 and 93, respectively, on the bearing sleeve 53, by means of the new and improved bearing assembly 50, the "tone" arm may be conveniently biased either toward or away from the turntable 15.

It will now, therefore, be seen that the new "tone" arm bearing assembly of the present invention is simplified in structure, efficient in operation, readily manufacturable, and low in cost.

While in accordance with the patent statutes, we have described what at present is considered to be the preferred embodiment of this invention, it will be obvious to those skilled in the art that various changes and modifications may be made therein without departing from this invention, and therefore, we aim to cover all such equivalent variations as fall within the true spirit and scope of this invention.

What we claim as new and desire to secure by Letters Patent of the United States is:

1. In a reproducing device; a support; a turntable arranged on said support for carrying a record member; means for rotating said turntable and said record member; a stylus carrying playback arm for reproducing sound from the sound grooves of a record member; a first bearing means to support said playback arm upon said support for horizontal pivotal movement relative to the horizontal surface of said turntable; said first bearing means consisting of a vertically extensive element, a unitary tubular bearing sleeve rotatably cooperable with said element, said element being secured to said support at one end thereof and extending downwardly therefrom and having a cylindrical external surface thereon, said unitary bearing sleeve being connected to said playback arm end having a cylindrical bore formed therein for rotatable cooperation with the cylindrical external surface of said element, thereby to facilitate pivotal movement of said playback arm and said sleeve upon said element about a vertical axis; retaining means located on the other end of the element to maintain rotatable cooperation between the sleeve and the element and a second bearing means to support said playback arm for vertical movement relative to the horizontal surface of said turntable, said second bearing means comprising a pair of horizontally extensive ears formed integrally upon opposite sides of the outer surface of said bearing sleeve, and a pair of apertures formed in opposed spaced apart walls of said playback arm, said apertures of said playback arm being located adjacent the supported end of said playblack arm and structured to cooperate with associated ears of the bearing sleeve, thereby to rotatably support said arm for movement about a horizontal axis by requiring no additional parts besides those of said first bearing means, whereby said first and second bearing means use only two parts and the retaining means to rotatably support said playback arm for movement about its horizontal and vertical axes.

2. As an article of manufacture, a bearing sleeve for pivotally supporting the tone arm of a phonograph device, said bearing sleeve having a generally tubular body and an integral upright portion extending outwardly from said body, said upright portion including a pair of vertically separated upper and lower hooks, respectively, one of said hooks being to receive one end of a tension spring for biasing said tone arm about a horizontal axis in a first direction and the other of said hooks being to receive one end of another tension spring for biasing said tone arm about a horizontal axis in a second direction opposite to said first direction, said bearing sleeve also including a pair of horizontally extensive integral ears formed on the outer surface of said tubular body for bearing engagement with a rotatable element cooperable with said sleeve.

3. In a reproducing device; a support; a turntable arranged on said support for carrying a record member; means for rotating said turntable and said record member; a stylus carrying playback arm for reproducing sound from the sound grooves of a record member; a first bearing means to support said playback arm upon said support for horizontal pivotal movement relative to the horizontal surface of said turntable; said first bearing means including a vertically extensive element and a tubular unitary bearing sleeve rotatably cooperable with said element; said element being secured to said support and having a cylindrical external surface thereon, said unitary bearing sleeve having a cylindrical bore formed therein for rotatable cooperation with the cylindrical external surface of said element, thereby to facilitate pivotal movement of said sleeve upon said element about a vertical axis; and a second bearing means to support said playback arm for vertical movement relative to the horizontal surface of said turntable, said second bearing means comprising a pair of horizontally extensive ears formed integrally upon opposite sides of the outer surface of said bearing sleeve, and a pair of apertures formed in opposed spaced apart walls of said playback arm, said apertures being located adjacent the supported end of said playback arm and structured to cooperate with associated ears of the bearing sleeve, thereby enabling said one piece bearing sleeve, said element, and the supported end of the playback arm to provide a basic structure involving a minimum number of parts for pivoting said playback arm about its horizontal and vertical axes, said bearing sleeve also including a generally integral upright portion extending outwardly from said body, said upright portion including a pair of vertically separated upper and lower hooks, respectively, one of said hooks being to receive one end of a tension spring for biasing said playback arm about a horizontal axis in a first direction and the other said hooks being to receive one end of another tension spring for biasing said playback arm about a horizontal axis in a second direction opposite to said first direction.

References Cited

UNITED STATES PATENTS

| | | | |
|---|---|---|---|
| 2,176,669 | 10/1939 | Guedon | 274—23 |
| 2,329,526 | 9/1943 | Germeshausen | 274—23 |
| 2,542,534 | 2/1951 | John | 274—23 |
| 3,083,971 | 4/1963 | Andres | 274—23 |

FOREIGN PATENTS

| | | |
|---|---|---|
| 824,701 | 12/1951 | Germany. |

HARRY N. HAROIAN, Primary Examiner